(12) United States Patent
Nadeau (10) Patent No.: US 9,921,373 B2
(45) Date of Patent: Mar. 20, 2018

(54) FIBER-OPTIC CONNECTOR MATING ASSEMBLY FOR OPTICAL TEST INSTRUMENTS

(71) Applicant: EXFO Inc., Quebec (CA)

(72) Inventor: Sebastien Nadeau, Saint-Augustin-de-Desmaures (CA)

(73) Assignee: EXFO INC., Quebec (CA)

( * ) Notice: Subject to any disclaimer, the term of this patent is extended or adjusted under 35 U.S.C. 154(b) by 227 days.

(21) Appl. No.: 14/571,808

(22) Filed: Dec. 16, 2014

(65) Prior Publication Data

US 2015/0177469 A1  Jun. 25, 2015

Related U.S. Application Data

(60) Provisional application No. 61/918,318, filed on Dec. 19, 2013.

(51) Int. Cl.
| | |
|---|---|
| *G02B 6/42* | (2006.01) |
| *G01M 11/00* | (2006.01) |
| *G02B 6/38* | (2006.01) |

(52) U.S. Cl.
CPC ......... *G02B 6/385* (2013.01); *G01M 11/3154* (2013.01); *G02B 6/4292* (2013.01)

(58) Field of Classification Search
CPC .................................. G02B 6/42; G01M 11/00
USPC .......................................................... 385/33
See application file for complete search history.

(56) References Cited

U.S. PATENT DOCUMENTS

| | | | |
|---|---|---|---|
| 4,690,437 A * | 9/1987 | Anderson, Jr. .... | G01N 30/6026 285/339 |
| 4,744,621 A | 5/1988 | Tanabe et al. | |
| 5,000,537 A | 3/1991 | Saito et al. | |
| 5,080,460 A * | 1/1992 | Erdman ............... | G02B 6/3887 385/81 |
| 5,131,063 A * | 7/1992 | Monroe ............... | G02B 6/3887 385/53 |

(Continued)

FOREIGN PATENT DOCUMENTS

| | | |
|---|---|---|
| EP | 0092129 A3 | 6/1986 |
| JP | 60237410 A | 11/1985 |

(Continued)

OTHER PUBLICATIONS

Unknown Author(s) "EXFO Accessories Overview", published in Canada by Exfo Electro-Engineering Inc., Dec. 2007, 40 pages.

(Continued)

*Primary Examiner* — Kaveh C Kianni
(74) *Attorney, Agent, or Firm* — Norton Rose Fulbright Canada LLP; Alexandre Daoust (57) ABSTRACT

There is provided a mating assembly for mating a fiber-optic termination comprising a fiber-optic ferrule to an optical test instrument. The mating assembly comprises: a holding body having internal tubular dimensions substantially complementary to corresponding external dimensions of the fiber-optic ferrule of said fiber-optic termination, to hold the fiber-optic ferrule in a given alignment relative to the optical test instrument; and at least one deformable elastomeric feature extending inwardly in the holding body to frictionally engage on a smooth external surface of said fiber-optic ferrule and to provide friction thereon to retain said fiber-optic ferrule.

16 Claims, 12 Drawing Sheets

(56) References Cited

U.S. PATENT DOCUMENTS

| | | | |
|---|---|---|---|
| 5,143,347 A | 9/1992 | Lee et al. | |
| 5,179,606 A * | 1/1993 | Kaihara | G02B 6/29332 385/45 |
| 5,323,475 A * | 6/1994 | Marsden | G02B 6/245 385/77 |
| 5,355,429 A * | 10/1994 | Lee | G02B 6/3887 385/134 |
| 5,822,137 A * | 10/1998 | Abul-Haj | G02B 7/02 359/808 |
| 5,862,282 A * | 1/1999 | Matsuura | G02B 6/3825 385/60 |
| 5,907,966 A * | 6/1999 | Moore | B23D 21/08 72/121 |
| 5,940,559 A * | 8/1999 | Noll | G01M 11/33 385/53 |
| 5,960,137 A * | 9/1999 | Noll | G01M 11/33 385/139 |
| 6,074,100 A | 6/2000 | Rowland et al. | |
| 6,116,101 A * | 9/2000 | Rader | G02B 6/3825 324/699 |
| 6,142,677 A * | 11/2000 | Sato | C08L 61/06 385/72 |
| 6,358,874 B1 * | 3/2002 | Kobayashi | C04B 35/486 385/147 |
| 6,419,405 B1 * | 7/2002 | Boscha | G02B 6/32 385/137 |
| 6,431,783 B2 * | 8/2002 | Nakajima | G02B 6/3887 174/73.1 |
| 6,464,402 B1 * | 10/2002 | Andrews | G02B 6/381 385/134 |
| 6,517,120 B1 | 2/2003 | Miyajima et al. | |
| 6,682,229 B2 | 1/2004 | Kao | |
| 7,178,988 B2 * | 2/2007 | Terakura | G02B 6/3843 385/53 |
| 7,572,065 B2 | 8/2009 | Lu et al. | |
| 7,585,116 B2 | 9/2009 | Cull et al. | |
| 7,621,674 B2 * | 11/2009 | Szilagyi | G02B 6/3885 385/53 |
| 7,669,860 B2 | 3/2010 | Chiang | |
| 8,393,804 B2 | 3/2013 | Nielson et al. | |
| 8,506,173 B2 | 8/2013 | Lewallen et al. | |
| 8,556,521 B2 | 10/2013 | Everett | |
| 2002/0136504 A1 * | 9/2002 | Boscha | G02B 6/4204 385/91 |
| 2004/0052476 A1 * | 3/2004 | Houmault | G02B 6/32 385/88 |
| 2007/0023067 A1 * | 2/2007 | Kida | B08B 11/00 134/6 |
| 2007/0172179 A1 * | 7/2007 | Billman | G01M 11/33 385/99 |
| 2009/0060418 A1 * | 3/2009 | Munn | G02B 6/3809 385/53 |
| 2011/0081117 A1 * | 4/2011 | Drake | G02B 6/1228 385/78 |
| 2011/0097044 A1 | 4/2011 | Saito et al. | |
| 2012/0213478 A1 | 8/2012 | Chen et al. | |
| 2012/0288238 A1 * | 11/2012 | Park | G02B 6/3823 385/80 |
| 2014/0294395 A1 * | 10/2014 | Waldron | G02B 6/3823 398/115 |
| 2015/0063761 A1 * | 3/2015 | Hallett | G02B 6/3826 385/86 |

FOREIGN PATENT DOCUMENTS

| | | |
|---|---|---|
| JP | 2006039334 A | 2/2006 |
| JP | 2006343448 A | 12/2006 |
| WO | WO2013074803 | 5/2013 |

OTHER PUBLICATIONS

Unknown Author(s), "Banner Fiber Optic Update", Issue FO102, printed in USA by Banner Engineering Corp., http://info.bannerengineering.com/xpedio/groups/public/documents/literature/60031.pdf, extracted on Nov. 20, 2013, 4 pages.

* cited by examiner

FIBER-OPTIC CONNECTOR MATING ASSEMBLY FOR OPTICAL TEST INSTRUMENTS

TECHNICAL FIELD

The invention relates to optical test instruments and more specifically to a mechanical connector interface employed for mating fiber-optic terminations to optical test instruments.

BACKGROUND OF THE ART

When inspecting the endface of a fiber-optic connector with a fiber inspection probe or when measuring the optical power at the output of a fiber-optic connector or any other fiber-optic termination with an optical power meter, the tested fiber-optic termination needs to be temporarily mated with the test instrument in proper optical alignment therewith. However, the tested fiber-optic termination generally does not need to be firmly attached to the test instrument (as it would be with a screw-threaded mechanism for example). Ideally, for efficiency of the testing operations, the connection and release should be made with the fewest possible manipulations.

A common solution to provide a quickly releasable mechanical connection between a ferrule connector under test and a fiber inspection probe is provided by employing a split ceramic sleeve enclosed within a tubular body. The diameter of the split sleeve is nominally slightly smaller than the diameter of the ferrule. When mating the connector, the split sleeve opens up slightly to accommodate as a connector ferrule is inserted therein. On account of its Young's modulus, the split sleeve exerts a transverse force on the ferrule, this force providing a small retention force so that the connector does not inadvertently detach from the fiber inspection probe during inspection. An operator can still easily disconnect the connector from the test instrument by simply pulling it out of the split sleeve.

Other solutions that exist employ a metal tip having a small hook (e.g. made of stainless steel) that expands to receive a connector ferrule therein. In reaction to deformation of the metal when the connector ferrule is inserted, a transverse force is exerted by the hook on the ferrule, which retains the connector ferrule on the fiber inspection probe.

A problem with the above-mentioned methods is that they are typically unduly fragile. In the case of the split ceramic sleeve, the sleeve often ruptures on mechanical impact or with use. In the case of the metal tip, it is very susceptible of being distorted by a mechanical impact, rendering it non-functional. Manufacturing of such tips is also difficult and therefore expensive.

There is therefore a need for a low cost and more robust system for temporarily mating and retaining fiber-optic terminations to test instruments, which also may be easily released.

SUMMARY

There is provided a mating assembly for mating a fiber-optic termination comprising a fiber-optic ferrule to an optical test instrument. The mating assembly serves to center and align the fiber-optic connector ferrule in the test instrument to within sufficient tolerance to allow the optical test to be performed (e.g. involving fiber endface imaging or optical power measurement) and to hold the ferrule with sufficient retaining force so as to prevent the fiber-optic termination from inadvertently detaching or moving while the test is being performed, and this without having to actually screw, lock or otherwise securely latch the fiber-optic termination to the instrument. The mating assembly employs the static friction of a rubber contact surface to provide the necessary retaining force. The mating assembly comprises a rigid tubular body and rubber features extending within the tubular body. The tubular body serves the centering and alignment function, whereas the rubber features extending inside the tubular body provide the necessary retaining friction on the smooth external surface of the ferrule (i.e. without complementary recesses on the ferrule to receive the rubber features).

In accordance with one aspect, there is provided a mating assembly for mating a fiber-optic termination comprising a fiber-optic ferrule to an optical test instrument. The mating assembly comprises: a holding body having internal tubular dimensions substantially complementary to corresponding external dimensions of the fiber-optic ferrule of said fiber-optic termination, in order to hold the fiber-optic ferrule in a given alignment relative to the optical test instrument; and at least one deformable elastomeric feature extending inwardly into the holding body to frictionally engage on a smooth external surface of said fiber-optic ferrule and to provide friction thereon to retain said fiber-optic ferrule.

Another aspect of the invention provides an optical test apparatus comprising: an optical test instrument for performing an optical test on a fiber-optic termination comprising a fiber-optic ferrule; and a mating interface for mating the fiber-optic termination to the optical test instrument. The mating interface comprises: a holding body having internal tubular dimensions substantially complementary to corresponding external dimensions of the fiber-optic ferrule, for holding the fiber-optic ferrule in a given alignment relative to the optical test instrument; and at least one elastomeric feature extending inwardly in the holding body so as to frictionally engage on a smooth external surface of said fiber-optic ferrule and to provide friction thereon and a corresponding retaining force.

In accordance with yet another aspect of the invention, there is provided a method for providing a mating interface for mating a fiber-optic termination comprising a fiber-optic ferrule to an optical test instrument, the method comprising:

provilding a holding body having internal tubular dimensions substantially complementary to corresponding external dimensions of the fiber-optic ferrule of said fiber-optic termination, in order to hold the fiber-optic ferrule in a given alignment relative to the optical test instrument;

machining at least one side window through the external surface of said holding body; and mounting a hollow elastomeric member around an external surface of said holding body such that the elastomeric member protrudes through said side window and inside the holding body so as to form at least one deformable elastomeric feature to frictionally engage on a smooth external surface of said fiber-optic ferrule when the same is inserted within the holding body and to provide friction thereon to retain said fiber-optic ferrule.

In this specification, unless otherwise mentioned, word modifiers such as "substantially" and "about" which modify a condition or relationship characteristic of a feature of features of an embodiment, should be understood to mean that the condition or characteristic is defined to within tolerances that are acceptable for proper operation of that embodiment in the context of an application for which it is intended.

BRIEF DESCRIPTION OF THE DRAWINGS

Further features and exemplary advantages of the present invention will become apparent to the skilled person from the following detailed description, taken in conjunction with the appended drawings, in which.

It will be noted that throughout the appended drawings, like features are identified by like reference numerals.

DETAILED DESCRIPTION

Figure 1A:
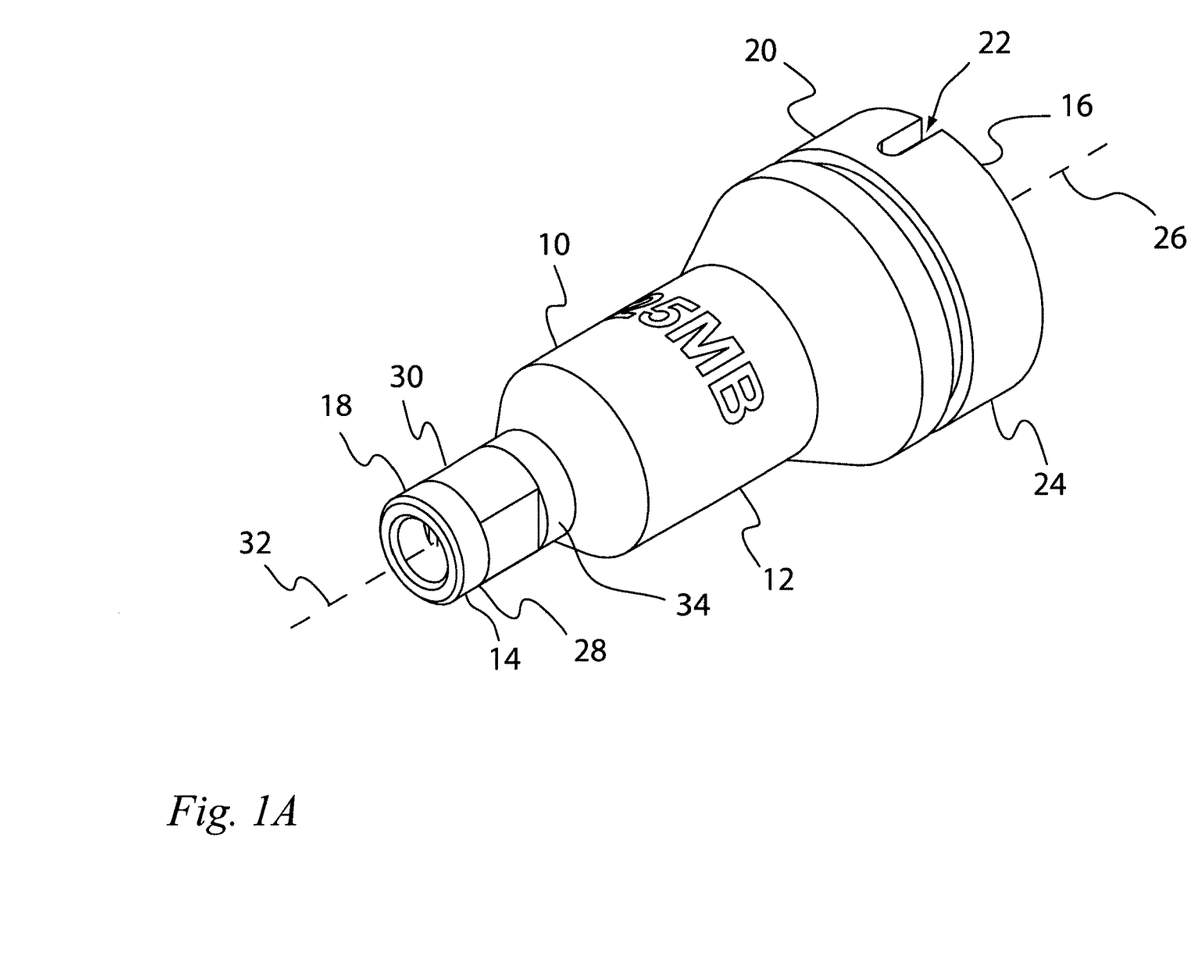
FIG. 1A is a perspective view of a fiber adapter tip comprising a mating assembly for mating a fiber-optic termination to an optical test instrument, in accordance with one embodiment.
Figure 1B:
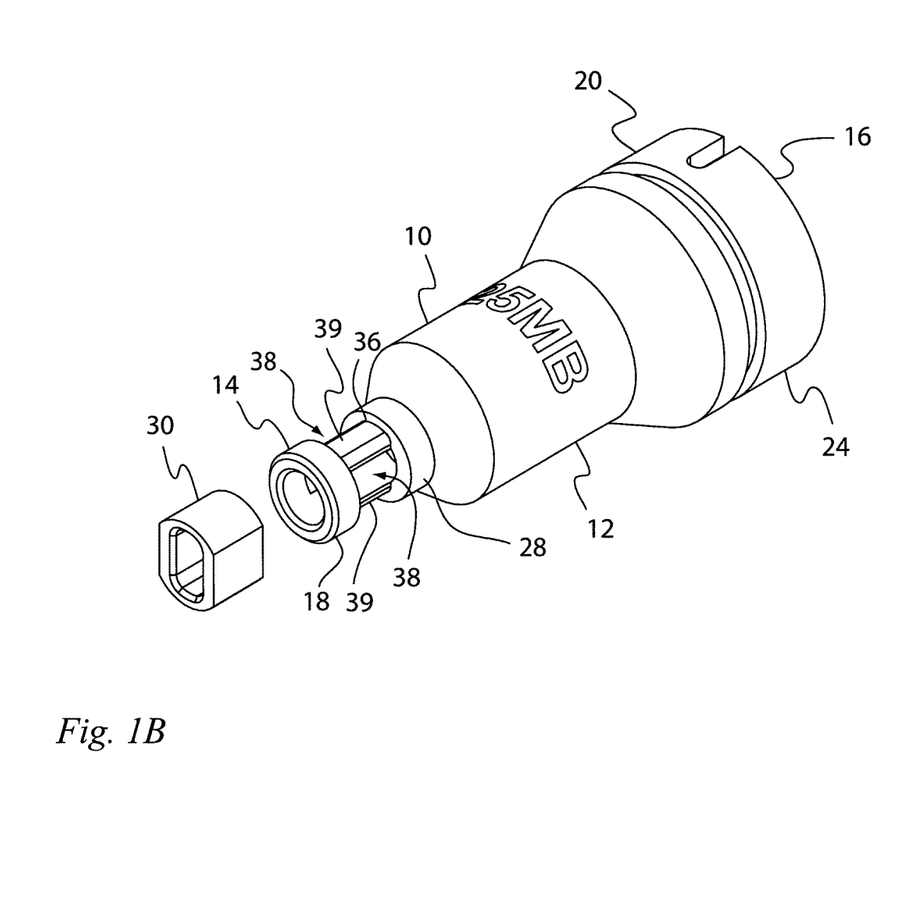
FIG. 1B is an exploded perspective view of the fiber adapter tip of FIG. 1 wherein the rubber ring is shown apart from the fiber adapter tip.
Figure 2:
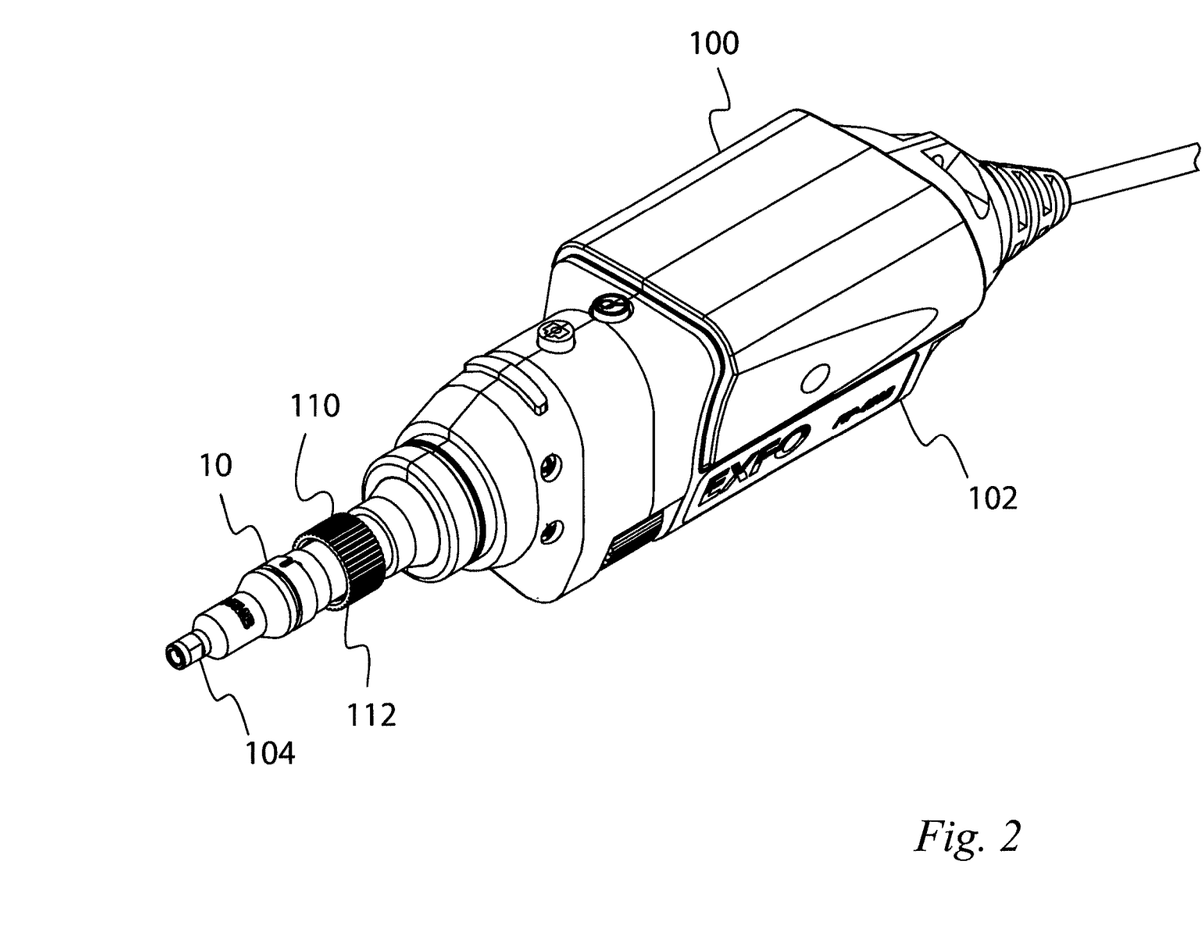
FIG. 2 is a perspective view of an optical test instrument employing the fiber adapter tip of FIG. 1.
Figure 3A:
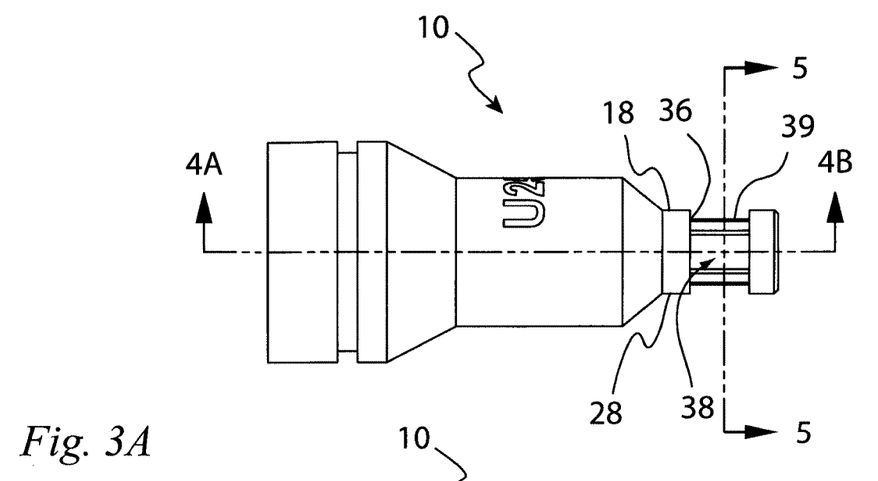
FIG. 3A is a side elevation view of the fiber adapter tip of FIG. 1 wherein the rubber ring is absent.
Figure 3B:
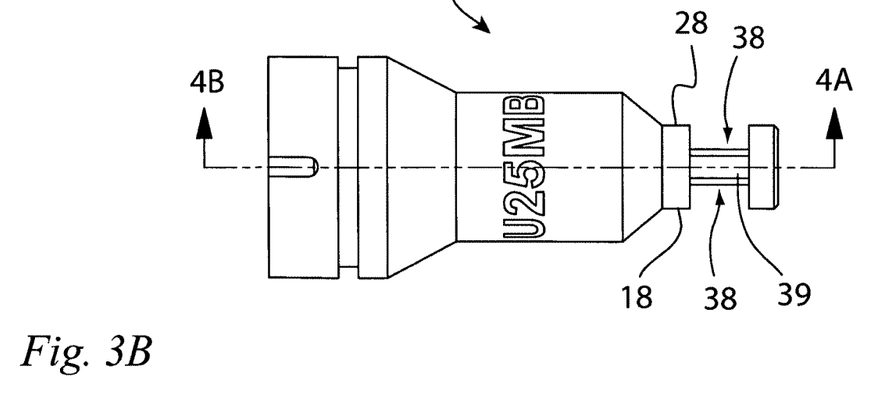
FIG. 3B is a top plan view of the fiber adapter tip of FIG. 1 wherein the rubber ring is absent.
Figure 4A:
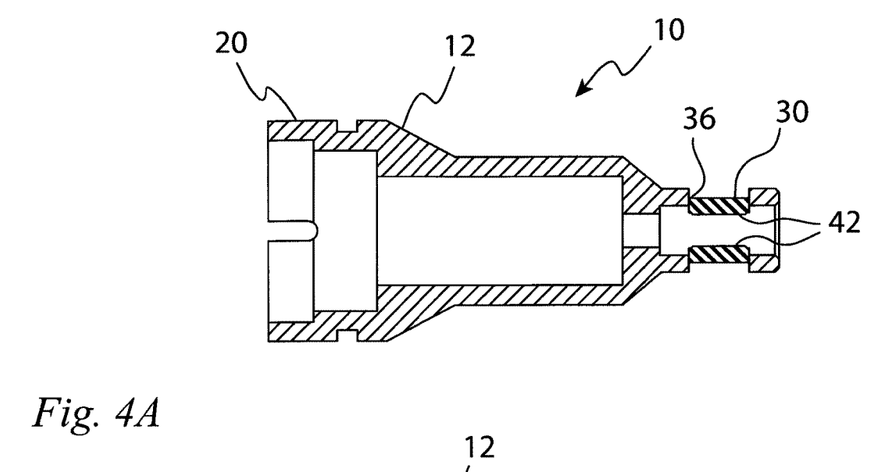
FIG. 4A is a cross-sectional view of the fiber adapter tip of FIG. 1 taken along line 4A-4A of FIG. 3B but wherein the rubber ring is shown.
Figure 4B:
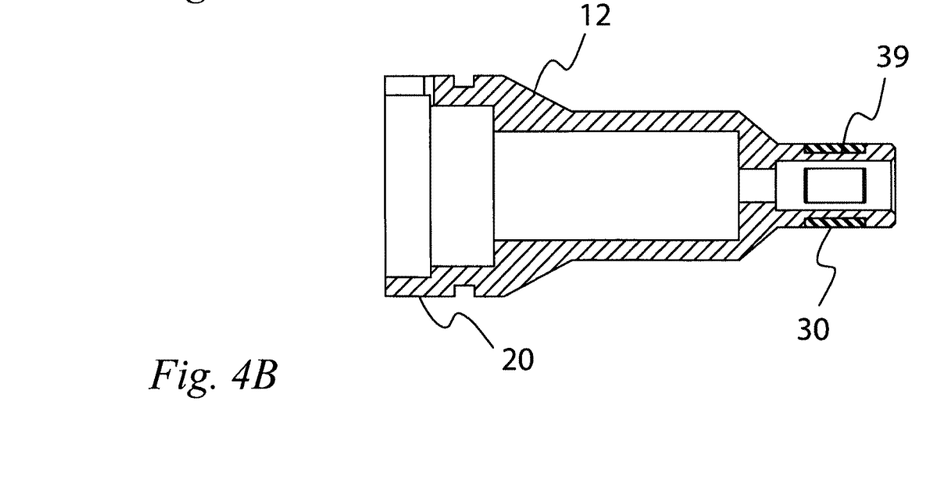
FIG. 4B is a cross-sectional view of the fiber adapter tip of FIG. 1 taken along line 4B-4B of FIG. 3A but wherein the rubber ring is shown.

Now referring to the drawings, FIGS. 1A-4B show a fiber adapter tip 10 that is to be employed with an optical test instrument. For example, as shown in FIG. 2, the fiber adapter tip 10 can be employed with a fiber inspection probe 100 for inspecting optical-fiber connector endfaces, or with an optical power meter for measuring optical power at the output of a fiber-optic connector or any other fiber-optic termination. The adapter tip 10 can also be employed with other optical test instruments. An optical test apparatus generally comprises an optical test instrument 102, such as a fiber inspection instrument in the case of the fiber inspection probe 100 of FIG. 2 or an optical power meter instrument, and a mating interface 104 which can be provided, for instance, on a fiber adapter tip 10.

The fiber adapter tip 10 is an accessory that is used to adapt a test instrument so as to accommodate different types of fiber-optic terminations employed in the industry. Fiber-optic terminations include patch cords equipped for example with Ferrule Connectors such as Physical Contact connectors (FC/PC), Angled Physical Contact connectors (FC/APC), SC/PC, SC/APC, E2000/PC, E2000APC, LC/UPC, LC/APC, MU/UPC, MU/APC, LX5/UPC, LX5/APC, etc. Possible fiber-optic terminations also include any of the above-mentioned connectors as coupled to a female-female coupling devices referred to in the industry as bulkhead adapters. In principle, fiber-optic terminations may also include any ferrule-mounted optical fiber, either with connecting mechanics (screw, snap, etc.) or not.

The fiber adapter tip 10 of FIGS. 1A to 4B is adapted for receiving any type of 2.5-mm PC ferrule connector (SC/PC, FC/PC, E2000/PC) and is interchangeable on the test instrument with fiber adapter tips suitable for any other type of fiber-optic termination.

As such, the fiber adapter tip 10 has a rigid and generally tubular body 12 having a proximal end 14 and a distal end 16. A mating assembly 18 for interfacing with a fiber-optic termination is positioned at the proximal end 14. A connection mechanism 20 at the distal end 16 serves to attach the adapter tip 10 to the test instrument. The tubular body 12 rigidly links the mating assembly 18 to the connection mechanism 20. In the illustrated embodiment, the connection mechanism 20 is a screw-threaded mechanism including threads 24 on the external surface of the fiber adapter tip 10 (threads not apparent in the figures). The fiber inspection probe 100 (see FIG. 2) has a corresponding connection mechanism 110 comprising a swiveled threaded ring 112. A notch 22 is provided on the connection mechanism 20 which is to be received in a corresponding key (not shown) on the connection mechanism 110 of the fiber inspection probe 100 to lock the adapter tip angularly. It is noted that this notch 22 and the key are optional but eases the manipulations necessary to connect the adapter tip 10 on the fiber inspection probe 100. The adapter tip 10 is attached to the fiber inspection probe 100 by screwing the threaded ring 110 on the threads 24 of the connection mechanism 20. Of course, other solid and releasable connection mechanisms such as a bayonet connector for example may be used instead. In this embodiment, the fiber adaptor tip 10 is made of a single integral piece of stainless steel, except for the rubber ring 30 (see below).

The mating assembly 18 serves to center and properly align the fiber-optic connector ferrule of the fiber-optic termination (not shown) to the optical axis 26 of the test instrument to within sufficient tolerance so as to allow the optical test to be performed (e.g. optical-fiber connector endface imaging or optical power capture) and to hold the ferrule (and therefore the optical fiber) with sufficient retaining force to prevent the fiber-optic termination from falling off or moving while the test is being performed, and this without having to actually fasten the fiber-optic termination to the instrument. The mating assembly 18 comprises a holding body 28 and a rubber ring 30. The holding body 28 is a rigid tubular body having cylindrical internal dimensions substantially complementary to the external dimensions of the ferrule of the fiber-optic termination. The internal dimensions of the holding body 28 are made with just enough mechanical play to easily accommodate the ferrule considering acceptable tolerances on such ferrules. The dimensions of the holding body 28 also define an axis 32 for the ferrule and serve to center and align this axis 32. In turn, the body 12 of the adapter tip 10 is configured so as to align the axis 32 of the ferrule with the optical axis 26 of the test instrument so as to allow the appropriate optical test to be performed by the test instrument. In this embodiment which is suitable for PC and UPC connectors for which the endface of the ferrule is perpendicular to its axis, the axis 32 of the ferrule is aligned to match the optical axis 26 of the test instrument so as to allow optical-fiber endface inspection or optical power measurement. However, it is noted that in the case of endface inspection of APC connectors, the axis 32 of the ferrule should be placed at an angle, e.g. at an 8-degree angle, relative to the optical axis of the test instrument. In this case, the holding body would be placed at such angle on the adapter tip to provide the proper alignment (see FIGS. 9A and 9B).

The holding body 28 also has a generally cylindrical external surface 34 and a circumferential recess 36 (seen in FIGS. 1B, 3A and 3B) on this external surface 34 to receive the rubber ring 30 and hold it in place on the holding body 28. As such, the width of the recess 36 corresponds to the longitudinal width of the rubber ring 30 within mechanical tolerances. In fact, the shape of the recess 36 is substantially complementary to that of the rubber ring 30 such that it holds tightly in place. Two side windows 38 traverse the holding body 28 through the external surface 34, within the recess 36. The two side windows 38 are disposed in mutual opposition on the circumference of the holding body 28, and each have a longitudinal width that corresponds to the longitudinal width of the rubber ring 30 and the recess 36 to allow the rubber ring 30 to protrude inside the holding body 28, through the side windows 38. Two opposing sections 39 (see FIG. 1B) of the holding body 28 remain within the recess 36 (i.e. where there is no window 38).

Figure 5A:
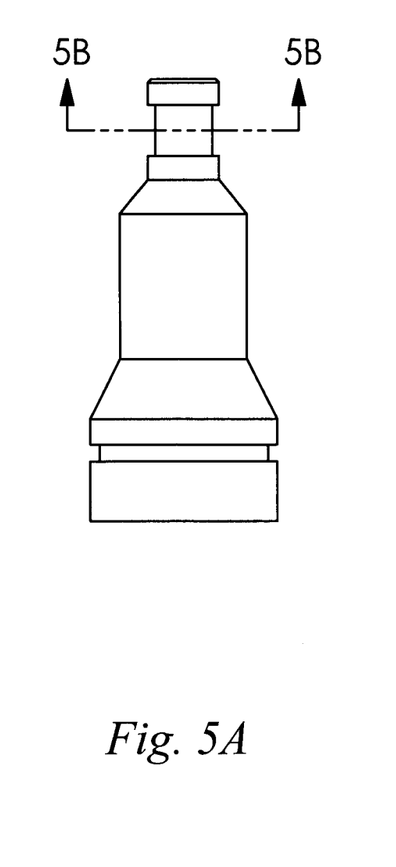
FIG. 5A is a bottom plan view of the fiber adapter tip of FIG. 1 wherein the rubber ring is shown.
Figure 5B:
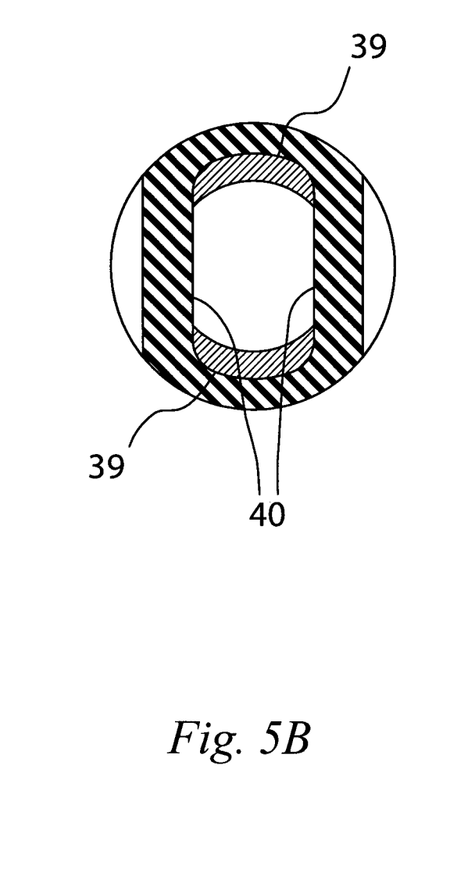
FIG. 5B is a cross-sectional view of the fiber adapter tip of FIG. 1 taken along line 5B-5B of FIG. 5A.

FIG. 5B is a transversal cross-sectional view of the fiber adapter tip 10 taken through the rubber ring 30, showing the rubber ring 30 as mounted on the holding body 28 when no connector ferrule is present. The rubber ring 30 is a hollow member (i.e. tubular) made of an elastomeric material. In this embodiment, the material used is silicon rubber but other elastomeric materials such as natural rubber may be employed as well. The rubber ring 30 has an oblong internal shape defining two parallel internal faces 40 that are, at rest, separated by a distance smaller than the internal diameter of the holding body 28 (and smaller than the diameter of the ferrule to be held). The rubber ring 30 is mounted around the external surface 34 of the holding body 28 within the recess 36, such that the extremities of the oblong shape rest on sections 39 and faces 40 are exposed within the holding body 28 by protruding through the side windows 38. The two opposite portions of the rubber ring 30 that protrude within the holding body 28 form two deformable rubber features 42 that extend inwardly into the holding body 28 to frictionally engage on the smooth external surface of the connector ferrule when it is inserted into the holding body 28. The rubber features 42 provide friction to retain the ferrule within the holding body 28.

It is should be noted that, although not visible in FIG. 5B, the internal dimensions of the rubber ring 30 at rest (i.e. before it is mounted to the holding body 18) are optionally slightly smaller than the external shape defined by sections 39, such that the rubber ring 30 is slightly stretched when mounted over sections 39. This is to ensure that it holds firmly in place during use and handling in general.

Figure 6:
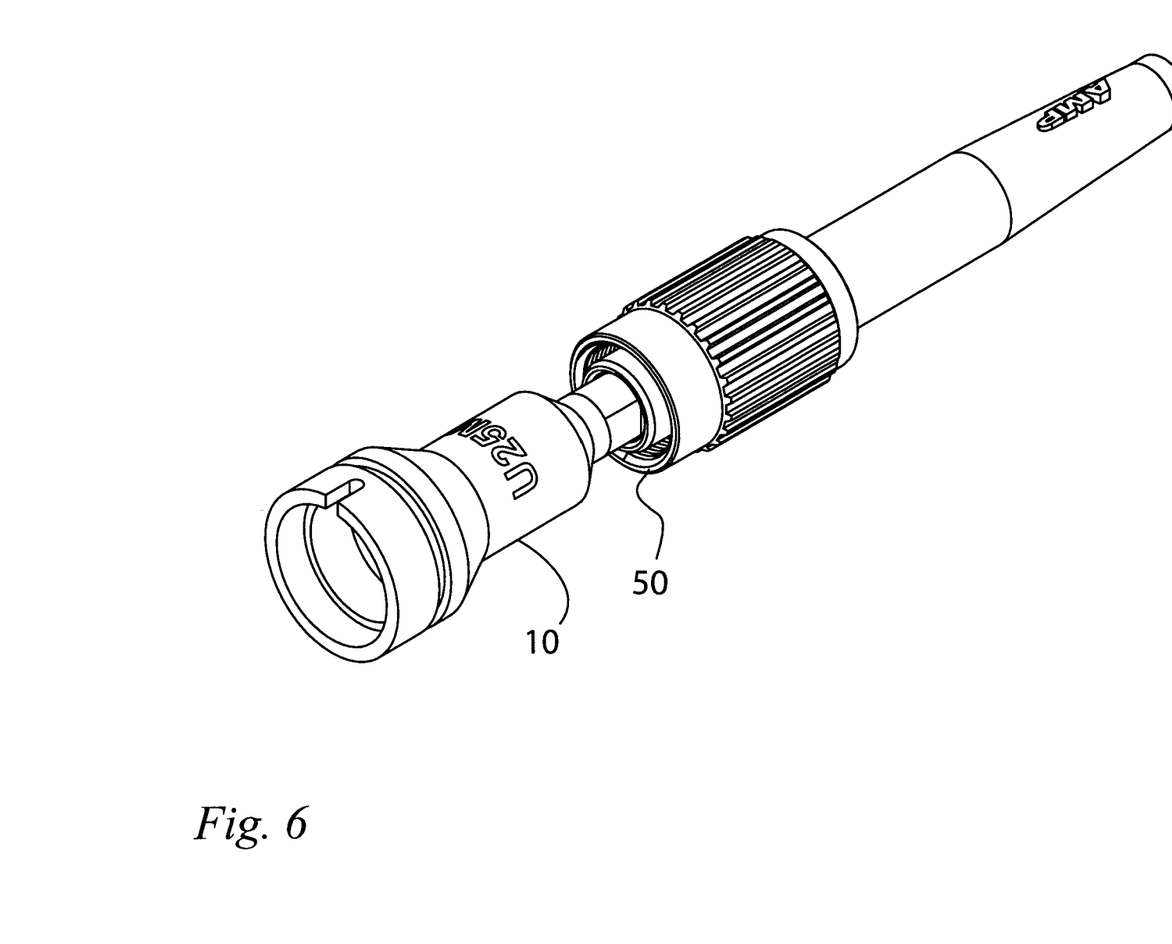
FIG. 6 is a perspective view of the fiber adapter tip of FIG. 1 shown together with a fiber-optic connector mated thereto.
Figure 7A:
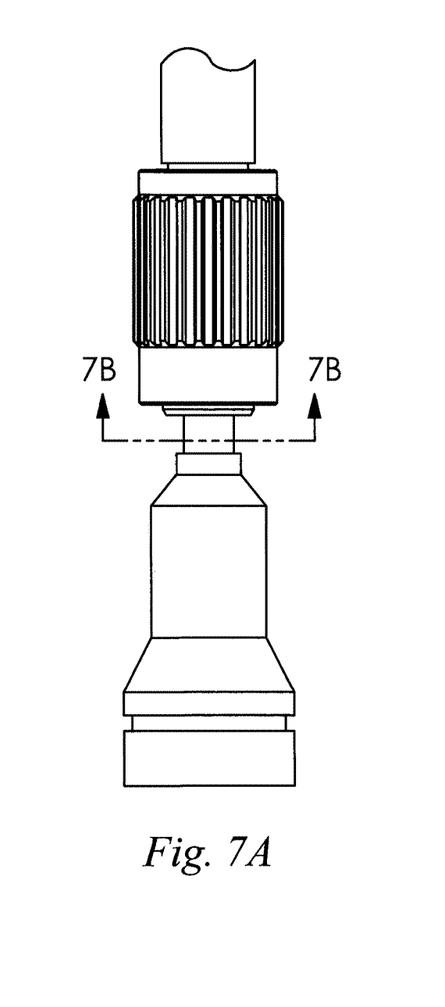
FIG. 7A is a bottom plan view of the fiber adapter tip of FIG. 1 shown together with a fiber-optic connector mated thereto.
Figure 7B:
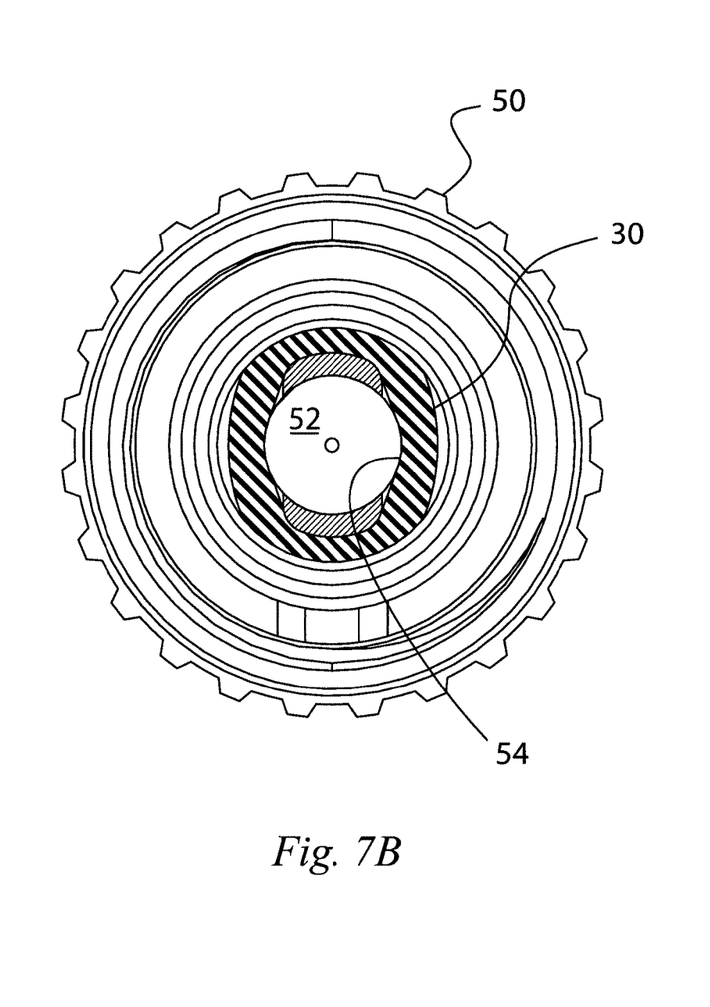
FIG. 7B is a cross-sectional view of the fiber adapter tip of FIG. 1 taken along line 7B-7B of FIG. 7A.
Figure 8A:
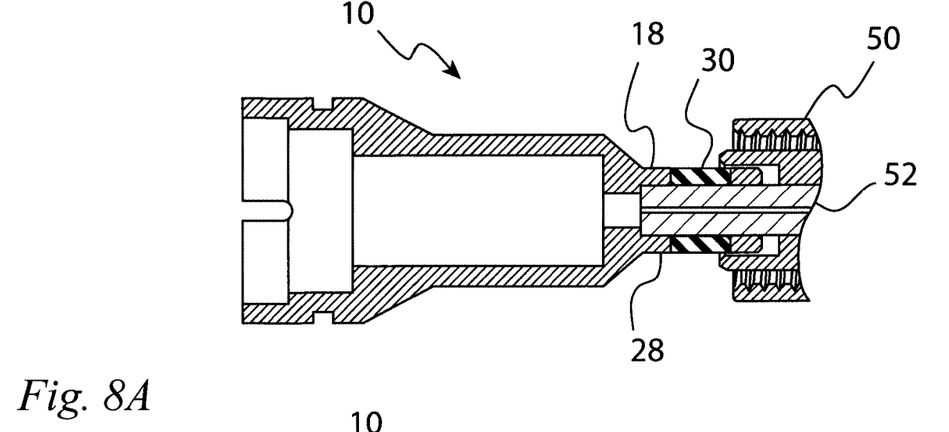
FIG. 8A is a cross-sectional view of the fiber adapter tip of FIG. 1 taken along line 4A-4A of FIG. 3B but wherein the rubber ring is shown (same as FIG. 4A) and wherein the fiber adapter tip is shown together with a fiber-optic connector mated thereto.
Figure 8B:
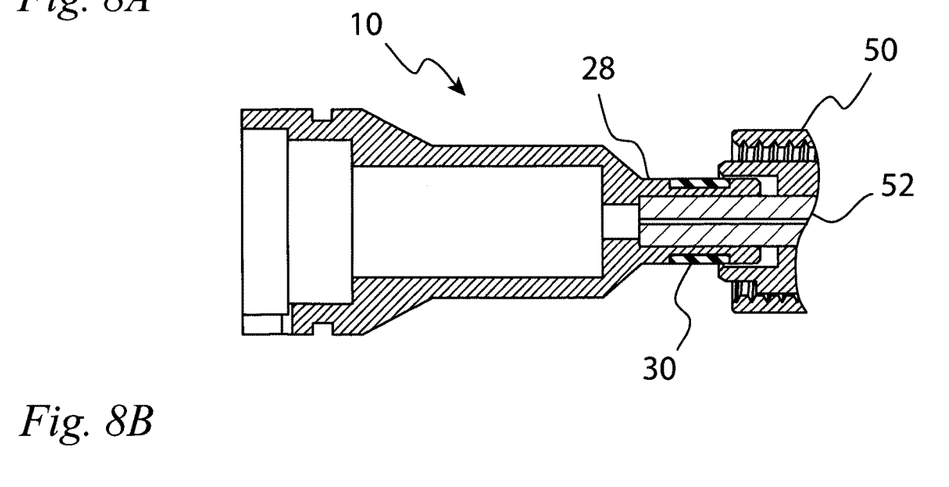
FIG. 8B is a cross-sectional view of the fiber adapter tip of FIG. 1 taken along line 4B-4B of FIG. 3B but wherein the rubber ring is shown (same as FIG. 4B) and wherein the fiber adapter tip is shown together with a fiber-optic connector mated thereto.

FIG. 6 shows the adapter tip 10 and a fiber-optic connector 50 that is mated thereto. It should be understood that, in use, the adapter tip 10 would actually be connected, via the connection mechanism 20, to a test instrument, which is not shown in FIG. 6. For inspection of the fiber-optic connector 50 or measurement of an optical signal at its output, the connector 50 is temporarily mated to the adapter tip 10 by sliding its connector ferrule 52 (see FIGS. 7A, 7B, 8A and 8B) inside the holding body 28.

FIGS. 7A, 7B, 8A and 8B show the mating assembly 18 with the connector ferrule 52 inserted therein for mating the fiber-optic connector 50 with the test instrument. It can be clearly seen that, when sliding the ferrule 52 inside the holding body 18, the rubber ring 30 deforms as it is pushed aside to allow the ferrule 52 to enter the holding body 28. This deformation arises from the small Young's modulus, i.e. elasticity, of the rubber itself for small strain values. The rubber features 42 frictionally engage the smooth cylindrical surface 54 of the ferrule 52. The ferrule 52 is therefore retained within the mating assembly 18 by the static friction between the rubber features 42 and the surface 54 of the ferrule 52, and the fiber-optic connector 50 is maintained in a given alignment relative to the test instrument by the holding body 28. It is noted that friction between the rubber features 42 and the surface 54 of the ferrule 52 is enhanced by the force inwardly exerted by deformation of the rubber ring 30.

The mating assembly 18 of FIGS. 1 to 8B is generally easy to manufacture because it does not require unusual or complex machining techniques and is composed of only a few separate parts, e.g. the holding body 28 and the rubber ring 30, which require only simple manipulations to assemble together. The holding body is machined out of a stainless-steel cylinder machined into a tubular body having internal tubular dimensions substantially complementary to that of the fiber-optic ferrule 52. The recess 36 can be machined on the external surface 34 of the tubular body by milling, and the side windows 38 can be machined through the external surface of the tubular body, inside the recess 36, to provide the holding body 28. Of course, some or all the machining steps can be performed by employing Computer Numerically Controlled (CNC) machine tools. The rubber ring 30 is typically made by molding and it is thereafter manually mounted around the holding body 30, within the recess 36.

It should also be noted that although in the embodiments illustrated herein the mating assembly 18 is part of a fiber adapter tip 10 that is releasable from the test instrument, in other embodiments the mating assembly 18 can be made integral with the test instrument. For instance, if the test instrument is to be dedicated to one or more specific types of fiber-optic terminations, a fiber adapter tip may not be required.

It will be readily understood that, although the fiber adapter tip 10 is adapted for receiving 2.5-mm PC ferrule connectors, dimensions of the mating assembly 18 may be modified to render it suitable for connector ferrules having other dimensions. It is also noted that the mating assembly 18 may be placed at a non-zero angle (e.g. an 8 degrees) relative to the optical axis of the test instrument, to better receive APC ferrule connectors.

Figure 9A:
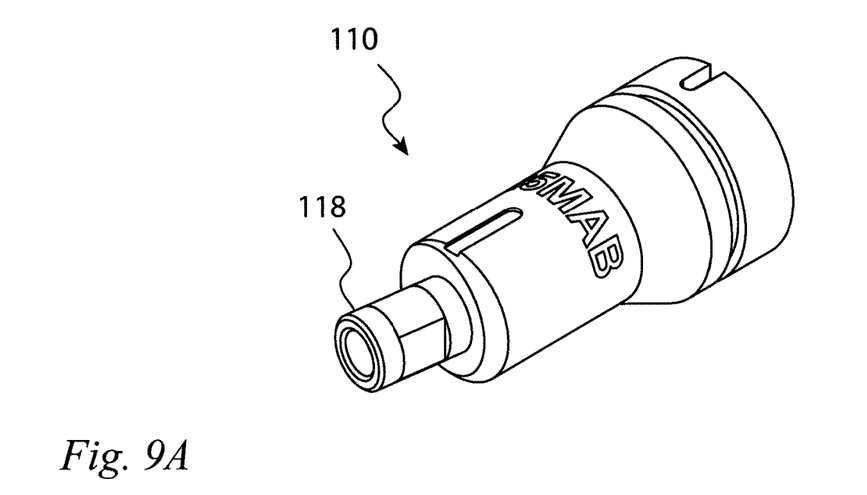
FIG. 9A is a perspective view of a fiber adapter tip in accordance with another embodiment wherein the fiber-optic termination to be mated is an Angled Physical Contact connector (APC)
Figure 9B:
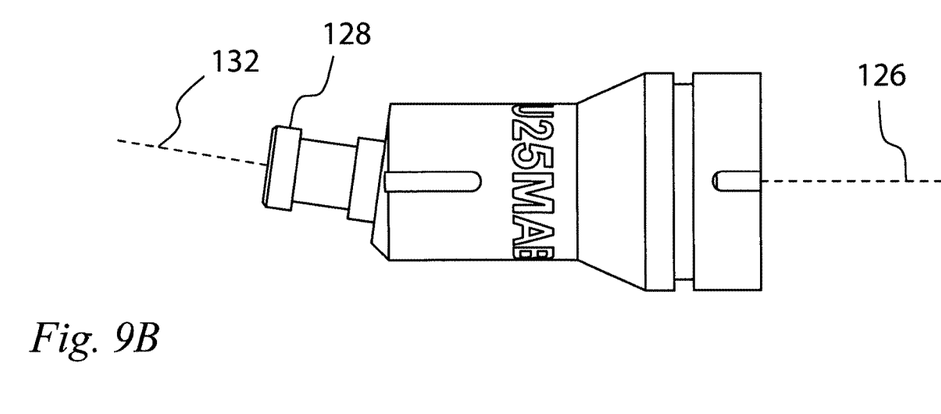
FIG. 9B is a top plan view of the fiber adapter tip of FIG. 9A.

In that respect, FIGS. 9A and 9B together show a fiber adapter tip 110 adapted to mate APC ferrule connectors to a test instrument. The mating assembly 118 is similar to the mating assembly 18 of FIGS. 1 to 8B and, consequently, many similar features are not repeatedly described. As in the fiber adapter tip 10, the mating assembly 118 comprises a generally tubular holding body 128. However, the holding body 128 is positioned such that its central axis 132 defines an 8-degree angle with the optical axis 126 of the test instrument. When an APC ferrule connectors is properly inserted in the holding body 128 (i.e. at the correct angular orientation), its optical-fiber endface is held perpendicular to the optical axis 126 of the test instrument for proper inspection.

Figure 10A:
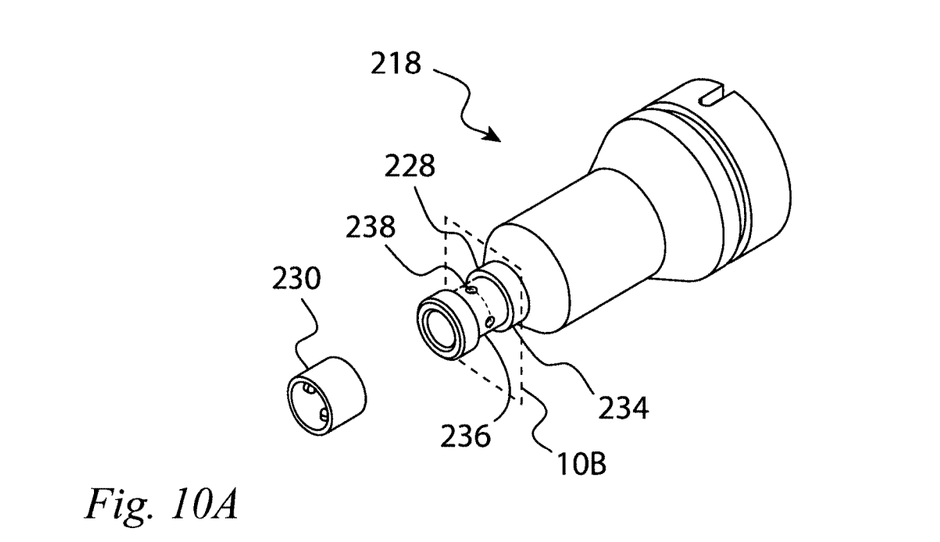
FIG. 10A is an exploded perspective view of a mating assembly in accordance with another embodiment and wherein the rubber ring is shown apart from the fiber adapter tip.
Figure 10B:
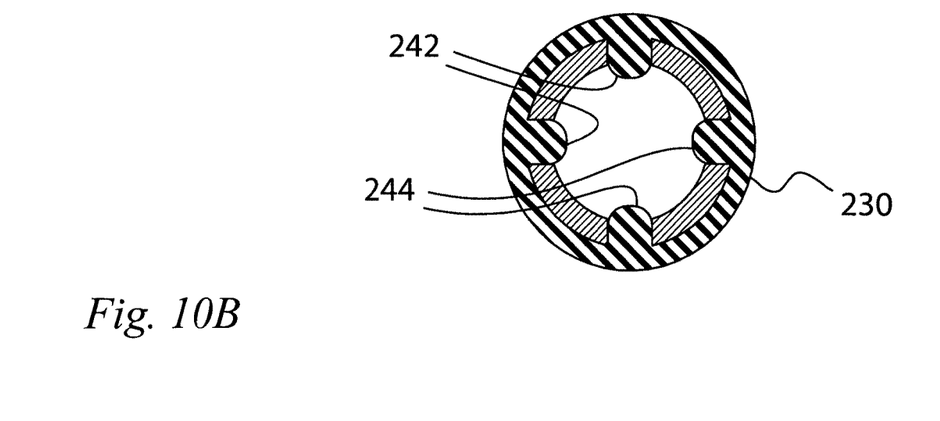
FIG. 10B is a cross-sectional view of the mating assembly of FIG. 10A taken along plan 10B of FIG. 10A but wherein the rubber ring is shown mounted on the fiber adapter tip.

It will also be understood that the embodiment of FIGS. 1 to 8B is meant to be exemplary only and that multiple variants of this embodiment may exist. For instance, one such variant is illustrated in FIGS. 10A and 10B, which show a mating assembly 218 in accordance with another embodiment. The mating assembly 218 is similar to the mating assembly 18 of FIGS. 1 to 8B and, consequently, many similar features are not repeatedly described. It may also be equivalently used with a fiber adapter tip or directly on a test instrument. The mating assembly 218 comprises a holding body 228 similar to that of FIGS. 1 to 8B and having a circumferential recess 236 on its external surface 234, and a rubber ring 230 that provides rubber features 242 within the holding body 228. In this embodiment, the rubber features 242 consist of rubber pins 244 disposed on the internal surface of the rubber ring 230 and protruding inside the holding body 228 through corresponding holes 238 within the recess 236. In this embodiment, the number of pins and holes is four, but other numbers may of course be envisaged. When a connector ferrule in inserted into the holding body 228, the pins 244 and the rubber ring 230 are deformed to provide the necessary space for the ferrule. Even with this deformation, the pins 244 remain in contact with the smooth surface of the ferrule and therefore provide friction on the ferrule and a corresponding retention force.

Figure 11:
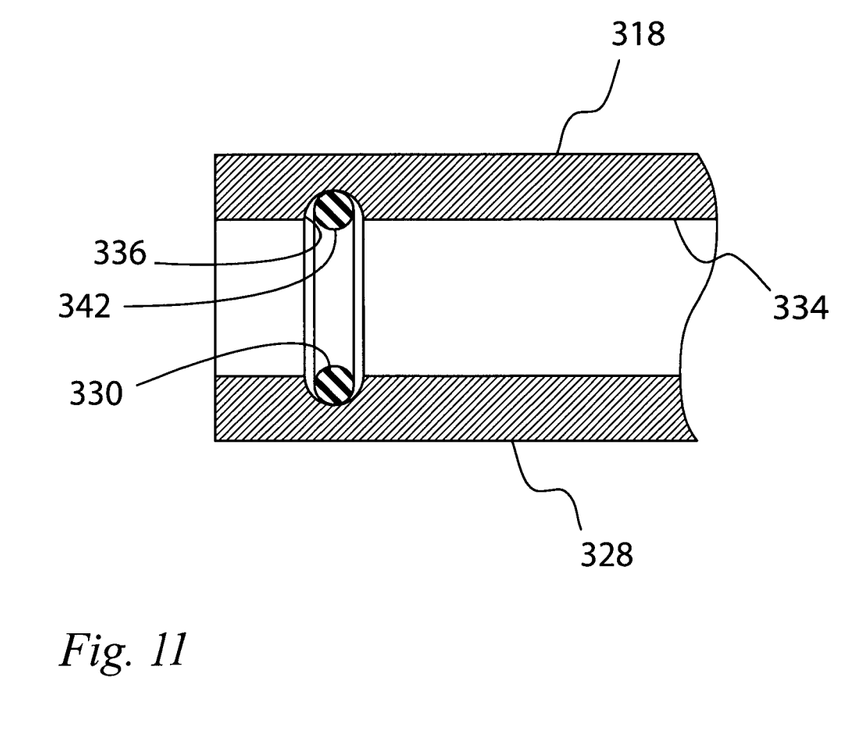
FIG. 11 is a cross-sectional view of a mating assembly, in accordance with yet another embodiment.

FIG. 11 shows another embodiment of a mating assembly 318 in which the rubber ring 330 is mounted inside the holding body 328 instead of outside. The mating assembly 318 has similarities with the mating assembly 18 of FIGS. 1 to 8B and, again, similar features are not repeatedly described. The mating assembly 318 comprises a holding body 328 similar to that of the embodiment of FIGS. 1 to 8B but having a circumferential groove 336 on its internal surface 334, and a rubber ring 330 that is held within the groove 336 to provide an annular rubber feature 342 within the holding body 328. The groove 336 is made wider than the rubber ring 330 at rest so as to allow the rubber ring 330 to deform when a connector ferrule in inserted into the holding body 328. The contact between the rubber ring 330 and the smooth surface of the ferrule provides the necessary friction on the ferrule. It should be noted that, although such an embodiment would be fully functional, its manufacturing would be more complex compared to that of the aforedescribed embodiments. This increased complexity arises principally from the difficulty to machine the groove 336 within such a small tubular enclosure, which is configured to hold fiber-optic ferrules having diameters typically of 1.25 or 2.5 mm, as well as the difficulty to mount the ring 330 within the enclosed groove 336.

The embodiments described above are intended to be exemplary only. The scope of the invention is therefore intended to be limited solely by the appended claims.

What is claimed is:

1. A mating assembly for mating a fiber-optic termination to an optical test instrument, the fiber-optic termination comprising a fiber-optic ferrule, the mating assembly comprising:
    a holding body, having internal tubular dimensions substantially complementary to corresponding external dimensions of the fiber-optic ferrule of the fiber-optic termination, to hold the fiber-optic ferrule in a given alignment relative to the optical test instrument;
    at least one deformable elastomeric feature extending inwardly from the internal tubular dimensions of the holding body and into the holding body to frictionally engage on a smooth external surface of said fiber-optic ferrule when the said fiber-optic ferrule is inserted within the holding body and to provide friction thereon to retain said fiber-optic ferrule;
    a hollow elastomeric member disposed around an external surface of said holding body; and
    at least one side window through the external surface of said holding body through which the elastomeric member protrudes inside the holding body to form said at least one elastomeric feature.

2. The mating assembly as claimed in claim 1, wherein said holding body has a recess on its external surface to receive said elastomeric member and wherein said at least one side window is located in the recess.

3. The mating assembly as claimed in claim 1, wherein said hollow elastomeric member has an oblong internal shape.

4. The mating assembly as claimed in claim 3, wherein said at least one side window comprises two side windows disposed in mutual opposition on a circumference of the holding body and wherein said hollow elastomeric member comprises two parallel internal faces which are separated by a distance smaller than the internal diameter of said holding body and which protrude respectively through the two side windows to form two of said at least one elastomeric feature.

5. The mating assembly as claimed in claim 1, wherein said mating assembly is employed in a fiber inspection instrument for inspecting the optical-fiber endface of the fiber-optic ferrule.

6. The mating assembly as claimed in claim 1, wherein said mating assembly is employed in an optical power meter test instrument for measuring the optical power exiting from an optical fiber of the fiber-optic ferrule.

7. The mating assembly as claimed in claim 1, wherein the elastomeric feature is made of silicon rubber.

8. A fiber adapter tip comprising the mating assembly as claimed in claim 1, and releasably connectable to a test instrument.

9. A optical test apparatus comprising:
    an optical test instrument for performing an optical test on a fiber-optic termination comprising a fiber-optic ferrule; and
    a mating assembly for mating the fiber-optic termination to the optical test instrument, the mating assembly comprising:
    a holding body having internal tubular dimensions substantially complementary to corresponding external dimensions of the fiber-optic ferrule, for holding the fiber-optic ferrule in a given alignment relative to the optical test instrument;

at least one elastomeric feature extending inwardly from the internal tubular dimensions of the holding body and into the holding body to frictionally engage on a smooth external surface of said fiber-optic ferrule and to provide friction thereon and a corresponding retaining force;

a hollow elastomeric member disposed around an external surface of said holding body; and at least one side window through the external surface of said holding body through which the elastomeric member protrudes inside the holding body to form said at least one elastomeric feature.

10. The optical test apparatus as claimed in claim 9, wherein said test instrument comprises a fiber inspection instrument for inspecting an optical-fiber endface of a fiber-optic ferrule.

11. The optical test apparatus as claimed in claim 9, wherein said test instrument comprises an optical power meter test instrument for measuring the optical power exiting from an optical fiber of the fiber-optic ferrule.

12. The optical test apparatus as claimed in claim 9, comprising a fiber adapter tip releasably connectable to said test instrument, said fiber adapter tip comprising said mating assembly.

13. The optical test apparatus as claimed in claim 9, wherein said holding body has a recess on its external surface to receive said elastomeric member and wherein said at least one side window is located in the recess.

14. The optical test apparatus as claimed in claim 9, wherein said hollow elastomeric member has an oblong internal shape.

15. The optical test apparatus as claimed in claim 14, wherein said at least one side window comprises two side windows disposed in mutual opposition on a circumference of the holding body and wherein said hollow elastomeric member comprises two parallel internal faces which are separated by a distance smaller than the internal diameter of said holding body and which protrude respectively through the two side windows to form two of said at least one elastomeric feature.

16. The optical test apparatus as claimed in claim 9, wherein the elastomeric feature is made of silicon rubber.

* * * * *